(No Model.)  2 Sheets—Sheet 1.

B. P. ROBERTS.
REGISTERING TICKET STAMP.

No. 336,162.  Patented Feb. 16, 1886.

Witnesses  
Wm. S. Billins  
Albert D. Porter

Benj. P. Roberts,  
Inventor,  
per  
Brown Bros  
Attorneys.

(No Model.) 2 Sheets—Sheet 2.

B. P. ROBERTS.
REGISTERING TICKET STAMP.

No. 336,162. Patented Feb. 16, 1886.

Witnesses

Benj. P. Roberts
Inventor
per Brown Bros.
Attorneys

UNITED STATES PATENT OFFICE.

BENJAMIN P. ROBERTS, OF BOSTON, MASSACHUSETTS.

REGISTERING TICKET-STAMP.

SPECIFICATION forming part of Letters Patent No. 336,162, dated February 16, 1886.

Application filed February 9, 1885. Serial No. 155,364. (No model.)

*To all whom it may concern:*

Be it known that I, BENJAMIN P. ROBERTS, of Boston, in the county of Suffolk and State of Massachusetts, have invented certain new and useful Improvements in Registering Apparatus, of which the following is a full, clear, and exact description.

In restaurants and other eating and drinking places, ticket-offices of railways, theaters, &c., and other places issuing "checks," so called, to patrons or customers, and in other business in the conduct of which checks or other certificates are passed out in representation of the amount purchased or due from the patron or customer, it is very desirable, as well known, for the making of a proper registry, and, as far as possible, accurate account or registry, to provide means for either registering or accounting for the checks and their amounts issued, which means, if used, shall be practically reliable and accurate, thus guarding against the possibility of fraud being practiced by the party having charge of the issue of such checks or other certificates so issued, and as a consequence secure the proper return of funds in accordance therewith.

It is to the issue of such checks and the registering of the amount thereof that this invention relates; and the invention consists, in substance, of mechanism for stamping each check issued with the amount or amounts for which it is issued, and registering the amounts thereof, substantially as hereinafter described.

In the accompanying plates of drawings this invention is illustrated.

Figure 1:
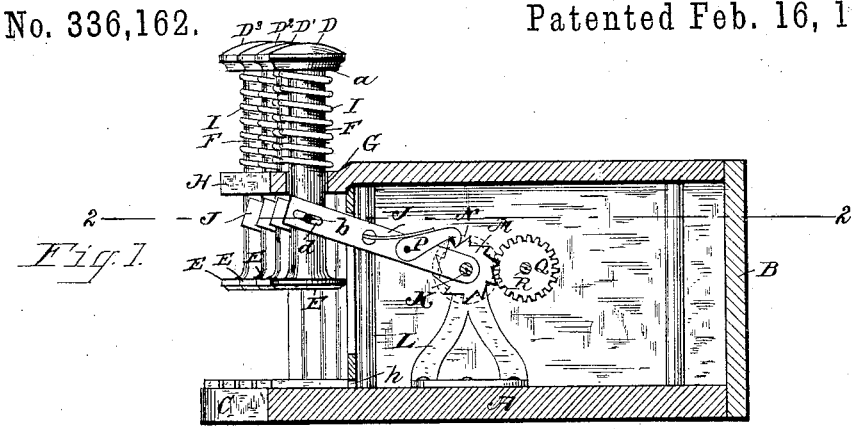
Figure 2:
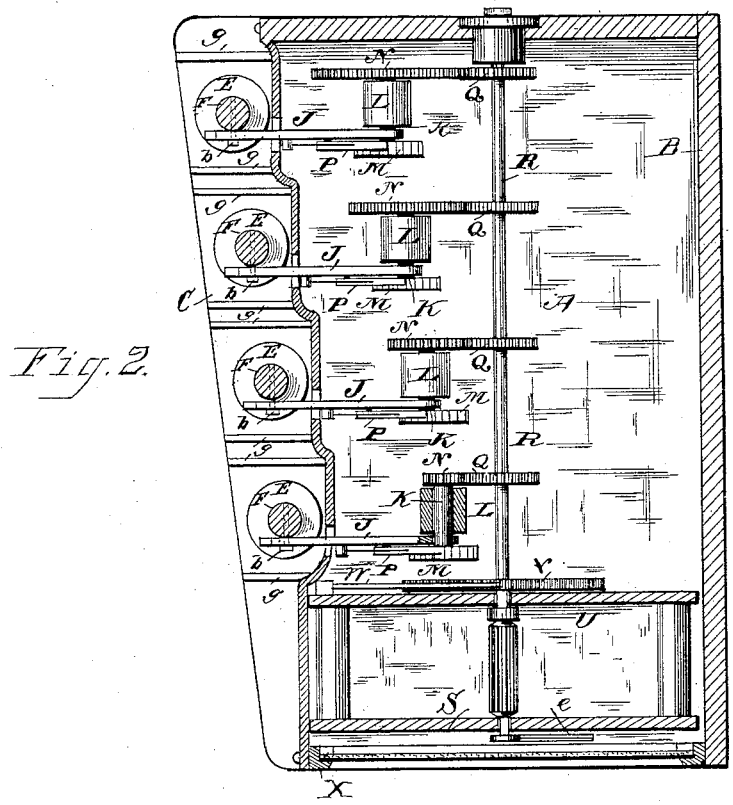
Figure 3:
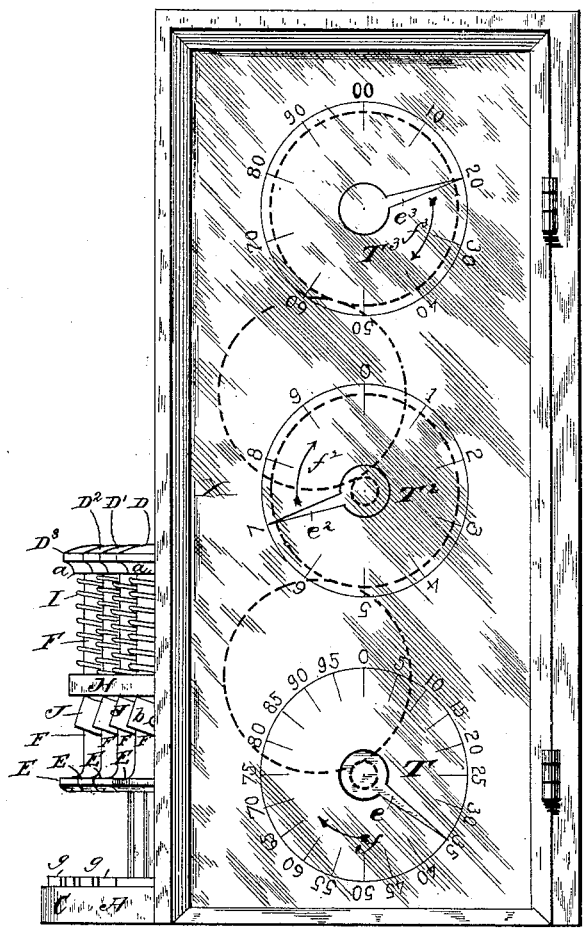

Figure 1 is a vertical section through and from front to rear of the casing of the part of the apparatus for stamping the checks with the amounts desired, and registering the total amount thereof. Fig. 2 is a horizontal section on line 2 2, Fig. 1. Fig. 3 is an end elevation.

In the drawings, A represents a horizontal bed-plate. This bed-plate makes the bottom of a casing or cabinet, B, and it extends, as at C, from the front side of the casing.

D D' D² D³ are a series of hand-stamps, four in number, arranged in a row in front of the casing B, and above the front projection, C, of the bed-plate A. Each hand-stamp consists of a horizontal stamping-head, E, at the lower end of a vertical stem, F, passing upward through a guiding-opening, G, of a horizontal platform, H, common to all the hand-stamps, and attached to the casing B.

I is a coiled spring surrounding the stem F, and confined between the upper side of the platform H and the shoulder $a$, made by the head or knob attached to said stem.

The stamp-head E of each hand-stamp is provided with a die or other device corresponding to the amount in cents, or other unit, which the stamp is to represent in the apparatus—as, for instance, the hand-stamp D with figures .05, representing five cents; D', with figures .10, representing ten cents; D², with figures .15, representing fifteen cents; and D³ with figures .20, representing twenty cents. The vertical stem F of each hand-stamp at one side has a horizontal projecting stud or pin, $b$, entering a slotted bearing, $d$, at one end and along the length of a bar or rod, J, which rod at its other end turns or swings upon a horizontal journal or shaft, K, as a fulcrum or center, of a standard or support, L, attached to the bottom of the casing. Each journal K turns in a suitable bearing of its support, and projecting from each side thereof it has attached to its projecting end, on the same side of said support L as that at which the arm J is hung upon it, a ratchet-wheel, M, and on the other side of said support a pinion or gear, N. The ratchet-wheels are all of the same size and same number (ten) of teeth, at equal distances apart, and the pinion or gear wheels N are of different sizes and of different numbers of teeth—that is, the pinion-wheel for the hand-stamp D has ten (10) teeth; for hand-stamp D', twenty (20) teeth; for hand-stamp D², thirty (30) teeth; and for hand-stamp D³, forty teeth. The teeth of all the gear-wheels are of equal size or pitch, and at equal distances apart. Each ratchet-wheel M is engaged by a spring-pawl, P, of the arms J, connected to the hand-stamp, as above stated, and in a manner in each downward movement or throw of a hand-stamp to rotate the ratchet-wheel connected with it one tooth, and on their upward throw to slip back and over the tooth of the ratchet and without effect thereon. The pinion or gear wheels N of the several ratchet-wheels M engage with a separate gear-wheel, Q, of a common horizontal shaft, R, which extends lengthwise of and turns in suitable bearings of the casing B. Each of the gear-wheels Q of the shaft R (which shaft is, in fact, the driving-shaft of the registering apparatus, as will hereinafter appear) has twenty (20) teeth of equal size, pitch, and distance apart, and said shaft extends into and through a vertical frame-work, U, located at one end of the casing and provided on its upright and outer and front face, S, with a series of graduated dial-faces, T T² T³, located one above the other and in line with each other. The lower dial, T, is concentric with the axis of the horizontal shaft R, and the shaft projects from it, carrying on its outer end a finger-piece or pointer, $e$, for said dial. The lower dial, T, has twenty (20) radial graduations at equal distances apart, and marked in steps of five each, in regular order from 0 to 95, both inclusive, running from left to right, or, in other words, in the direction of the arrow $f$, Fig. 3, which is the direction of the rotation of the pointer $e$ for said dial from the rotation of the shaft to which it is attached, caused by a downward throw of any one of the hand-stamps. The next and middle dial, T², has ten (10) radial graduations at equal distances apart, and marked in steps of one each in regular order from 0 to 9, both inclusive, running from left to right, or, in other words, in the direction of the arrow $f^2$, Fig. 3, which is the direction of rotation of the pointer $e^2$, for said dial T² in the operation of the apparatus. The next and upper dial, T³, has ten (10) radial graduations at equal distances apart and marked in steps of ten each, in regular order from 00 to 90, both inclusive, running from left to right, or, in other words, in the direction of the arrow $f^3$, which is the direction of rotation of the pointer $e^3$ for said dial T³ in the operation of the apparatus. The pointers $e^2$ $e^3$ of the middle and upper dials, T² T³, receive their movements from the rotation of a common driving-shaft, R, to which they are connected, the pointer $e^3$ of upper dial, through the pointer $e^2$ of middle, T², to the pointer $e$, by a train of gearing (shown in dotted lines, Fig. 3) of suitable arrangement to secure from each complete rotation of the pointer for the lower dial, or, what is the same, each complete rotation of the shaft, a movement of the pointer of the middle dial through and for one graduation of said dial, and for each complete rotation of the pointer for the middle dial, T², or, what is the same, ten complete rotations of the shaft R, a movement of the pointer of the upper dial and through and for one graduation of said dial. The projection C of the bed-plate A at the front of the casing constitutes the bed of the stamp, and upon this the paper which is to make the check is placed to be stamped as circumstances may require. It is desirable that the figures of the separate stampings of a check should be placed directly under each other, and thus put in column form, and to insure this the bed is provided with parallel side strips, $g$ $g$, projecting forward from the front of the casing for each stamp, the width between each set of guides corresponding to the width of the check-paper. Again, it is desirable that the apparatus be made compact, so as to occupy comparatively little space, and one important step to that end is to have the stamps located in as close proximity to the front of the casing as is best for their use, and consequently in order that a check may be successively stamped and in column form the front of the casing is slotted, as at $h$, to allow the check, if necessary, to pass under and through it.

V is a ratchet or friction wheel, secured to driving-shaft R, and W is a spring or other resistance applied to said ratchet, all for preventing the movement of the driving-shaft in the wrong direction, and a movement in any direction only so far as the same is positively moved by the pawl in its operation from the depression of the hand-stamp.

With the apparatus herein described the stamping of the check as described is secured by placing it on the bed of the appropriate stamp and then forcing said stamp down and against it, which after making its imprint and on being released returns to its normal position from the recoil of its spring I. By this action of the stamp the registering mechanism connected with it is operated, registering the same upon the series of dials connected with it, as has been described. This registration as to the denomination or amount of the stamps D D' D² D³ is secured in the case of every stamp by a throw of equal length, securing, through the medium of the pawl and ratchet and gear connection between it and a common driving-shaft, R, a rotation of said shaft in exact conformity therewith—that is, in the case of the stamp D a rotation equal to one graduation of dial T; of stamp D', a rotation equal to two graduations of dial T; of stamp D², a rotation equal to three graduations of dial T, and of stamp D³ a rotation equal to four graduations of dial T, thus making a registration at said dial of the amounts represented by the separate stamps.

Although only four stamps have been shown and described, more or less stamps may be used, and, again, they may be adapted for another unit than .05 cents, the unit particularly described.

The apparatus for this invention can be used for checks in various kinds of business, and for railroad, theater, and other tickets.

Having thus described my invention, what I claim, and desire to secure by Letters Patent, is—

1. In an apparatus for stamping and registering checks, tickets, &c., a reciprocating hand-stamp, D, connected by an arm carrying a spring-pawl, P, with a shaft, K, having a ratchet-wheel, M, and a gear-wheel, N, in combination with shaft R, having a gear-wheel, Q, meshing with said gear-wheel N, and connected to a registering mechanism, substantially as described, for the purpose specified.

2. In an apparatus for stamping and registering checks, tickets, &c., a series of reciprocating hand-stamps, D, each connected by an arm, J, carrying a spring-pawl, P, with separate shafts K, each having a ratchet-wheel, M, of equal size, and gear-wheels N, of unequal size, in combination with a shaft, R, having gear-wheels Q of equal size, each meshing with a gear-wheel, N, and connected to a registering mechanism, substantially as described, for the purpose specified.

In testimony whereof I have hereunto set my hand in the presence of two subscribing witnesses.

BENJN. P. ROBERTS.

Witnesses:
ALBERT W. BROWN,
WM. S. BELLOWS.